(12) United States Patent
Wang et al.

(10) Patent No.: US 11,343,724 B2
(45) Date of Patent: May 24, 2022

(54) USER EQUIPMENT CONTEXT MANAGEMENT METHOD, APPARATUS, AND DEVICE

(71) Applicant: HUAWEI TECHNOLOGIES CO., LTD., Guangdong (CN)

(72) Inventors: Yuan Wang, Shanghai (CN); Zhongping Chen, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 300 days.

(21) Appl. No.: 16/258,227

(22) Filed: Jan. 25, 2019

(65) Prior Publication Data

US 2019/0159078 A1 May 23, 2019

Related U.S. Application Data

(63) Continuation of application No. PCT/CN2016/091934, filed on Jul. 27, 2016.

(51) Int. Cl.
*H04W 36/00* (2009.01)
*H04W 36/08* (2009.01)
(Continued)

(52) U.S. Cl.
CPC ......... *H04W 36/0033* (2013.01); *H04W 8/08* (2013.01); *H04W 28/0268* (2013.01);
(Continued)

(58) Field of Classification Search
None
See application file for complete search history.

(56) References Cited

U.S. PATENT DOCUMENTS

2012/0082090 A1*  4/2012  Horn ............... H04W 76/10
                                                    370/328
2012/0177005 A1   7/2012  Liang et al.
(Continued)

FOREIGN PATENT DOCUMENTS

CN    102326442 A    1/2012
CN    102595386 A    7/2012
(Continued)

OTHER PUBLICATIONS

InterDigital,"Solution to support different level of mobility",SA WG2 Meeting #116 S2-164103,Jul. 11-15, 2016, Vienna, Austria,total 7 pages.
(Continued)

*Primary Examiner* — Ayaz R Sheikh
*Assistant Examiner* — Sori A Aga
(74) *Attorney, Agent, or Firm* — Womble Bond Dickinson (US) LLP

(57) ABSTRACT

The present invention discloses a user equipment context management method, apparatus, and device, and relates to the field of communications technologies. The method includes: receiving, by a first control plane entity, a service request message of user equipment UE, where the service request message includes service information requested by the UE; obtaining location information of the UE, determining, based on the service information requested by the UE, a mobility level of a service requested by the UE, determining, based on the location information of the UE and the mobility level of the service, an effective range of a context of a network resource bearing the service of the UE, and managing the context based on the effective range of the context.

15 Claims, 9 Drawing Sheets

(51) Int. Cl.
*H04W 8/08* (2009.01)
*H04W 28/02* (2009.01)
*H04W 76/11* (2018.01)

(52) U.S. Cl.
CPC ....... *H04W 36/0022* (2013.01); *H04W 36/08* (2013.01); *H04W 76/11* (2018.02)

(56) References Cited

U.S. PATENT DOCUMENTS

| | | |
|---|---|---|
| 2012/0182912 A1 | 7/2012 | Watfa et al. |
| 2013/0028237 A1* | 1/2013 | Cheng ............... H04W 36/0033 370/331 |
| 2015/0092665 A1 | 4/2015 | Choi et al. |
| 2016/0073450 A1* | 3/2016 | Vikberg .......... H04W 36/00837 370/329 |
| 2016/0174285 A1 | 6/2016 | Ke et al. |
| 2016/0183156 A1 | 6/2016 | Chin et al. |
| 2019/0028943 A1* | 1/2019 | Wang ................... H04W 8/065 |
| 2019/0182873 A1* | 6/2019 | Wass ..................... H04W 76/10 |
| 2019/0200280 A1* | 6/2019 | Ramle .................. H04W 48/04 |
| 2019/0289571 A1* | 9/2019 | Park ....................... H04W 68/02 |

FOREIGN PATENT DOCUMENTS

| | | |
|---|---|---|
| CN | 103229546 A | 7/2013 |
| CN | 104349374 A | 2/2015 |
| WO | 2009117886 A1 | 10/2009 |
| WO | 2016111590 A1 | 7/2016 |

OTHER PUBLICATIONS

NEC,"Service continuity between unicast and multicast delivery",SA WG2 Meeting #99 S2-133780,Sep. 23-27, 2013, Xiamen, P.R. China,total 4 pages.

3GPP TS 23.401 V14.0.0 (Jun. 2016);3rd Generation Partnership Project;Technical Specification Group Services and System Aspects;General Packet Radio Service (GPRS) enhancements for Evolved Universal Terrestrial Radio Access Network (E-UTRAN) access(Release 14),total 374 pages.

3GPP TR 23.799 V0.6.0 (Jul. 2016);3rd Generation Partnership Project;Technical Specification Group Services and System Aspects; Study on Architecture for Next Generation System(Release 14),total 321 pages.

* cited by examiner

USER EQUIPMENT CONTEXT MANAGEMENT METHOD, APPARATUS, AND DEVICE

CROSS-REFERENCE TO RELATED APPLICATIONS

This application is a continuation of International Application No. PCT/CN2016/091934, filed on Jul. 27, 2016, the disclosure of which is hereby incorporated by reference in its entirety.

TECHNICAL FIELD

The present invention relates to the field of communications technologies, and in particular, to a user equipment context management method, apparatus, and device.

BACKGROUND

A mobility level is a level of mobility support provided by a network for user equipment (UE). The mobility support means that the network needs to ensure continuity of a service of the UE in a specified range. To be specific, when the UE moves, provided that the UE does not move out of the specified range, the network needs to ensure that a network resource that bears the service of the UE is always valid, so that the service of the UE is not affected by the movement of the UE. To ensure that the service of the UE is not affected by the movement of the UE in the specified range, a context of the network resource bearing the service of the UE needs to be transferred between nodes in the specified range. However, if the UE moves out of the specified range, the network does not have to ensure the continuity of the service of the UE, and the context of the network resource bearing the service of the UE is no longer transferred.

An existing mobility support solution is as follows: UE establishes a local Internet Protocol (IP) access function (LIPA) public data network (PDN) connection to a network. When establishing the foregoing LIPA PDN connection, a network side selects a local gateway associated with a local base station (a base station in an area in which the UE is located), and establishes a user plane path between the local base station and the local gateway, to carry service data of the UE. When the UE moves out of a coverage area of the local base station, a UE context corresponding to the LIPA PDN connection is invalid, and the network deletes all UE contexts corresponding to the PDN connection.

Because the foregoing PDN connection actually includes a plurality of bearers, and different bearers may bear different types of services, when a bearer of a service with a relatively high continuity requirement exists in the bearers included in the PDN connection, this manner of deleting all UE contexts corresponding to the PDN connection may cause deletion of a context of the bearer of the service with a relatively high continuity requirement, and continuity of the service is affected.

SUMMARY

This application provides a user equipment context management method, apparatus, and device, to resolve an existing problem that continuity of some services with a relatively high continuity requirement is affected because contexts of network resources bearing these services are deleted when UE moves out of a specified range.

According to a first aspect, a user equipment context management method is provided, where the method includes:

receiving, by a first control plane entity, a service request message of user equipment UE, where the service request message includes service information requested by the UE;

obtaining location information of the UE;

determining, based on the service information requested by the UE, a mobility level of a service requested by the UE;

determining, based on the location information of the UE and the mobility level of the service, an effective range of a context of a network resource bearing the service of the UE; and managing the context based on the effective range of the context.

In this embodiment of the present invention, the location information of the UE is obtained, the mobility level of the service requested by the UE is determined, and the effective range of the context of the network resource bearing the service of the UE is further determined, so that during context management, a network may manage the context of the UE based on the effective range of the context of the network resource bearing the service of the UE (for example, choose whether to delete or transfer the context), to avoid a problem that continuity of some services with a relatively high continuity requirement is affected because contexts of network resources bearing these services are deleted.

The location information of the UE includes but is not limited to cell location information (for example, an evolved Universal Mobile Telecommunications System UMTS terrestrial radio access network E-UTRAN cell global identifier ECGI), radio access network node RAN node identification information, tracking area information (for example, a tracking area identity TAI), and access technology information (for example, the UE is currently located in a 4G cell or a 5G cell).

The mobility level of the service is indicated by using an area range or an access technology. The area range may be a cell or a registration area (for example, a tracking area list). The access technology may be a 3GPP access technology, or a Long Term Evolution LTE or 5G access technology, or the like.

The network resource bearing the service is a network resource allocated to bear the service of the UE, for example, a PDN connection, a bearer, or an IP flow. The UE context corresponding to the network resource bearing the service is a context that can uniquely identify and describe the network resource, and may include information such as a bearer identifier of a bearer and a tunnel endpoint identifier TED.

In one embodiment, the determining, based on the service information requested by the UE, a mobility level of a service requested by the UE includes:

obtaining a preset correspondence between a service and a mobility level; and determining, based on the service information requested by the UE and the correspondence between a service and a mobility level, the mobility level of the service requested by the UE.

With reference to the first aspect, in a second implementation of the first aspect, the determining, based on the service information requested by the UE, a mobility level of a service requested by the UE includes:

obtaining a service level agreement SLA sent by an application function, where the SLA includes a correspondence between a service and a mobility level; and determining, based on the service information requested by the UE and the SLA, the mobility level of the service requested by the UE.

With reference to the first aspect, in a third implementation of the first aspect, the determining, based on the service information requested by the UE, a mobility level of a service requested by the UE includes:

obtaining subscription data of the UE, where the subscription data includes a correspondence between a service and a mobility level; and determining, based on the service information requested by the UE and the subscription data of the UE, the mobility level of the service requested by the UE.

In the foregoing three implementations, three implementations for determining the mobility level of the service are provided. One is implemented through a pre-configuration. To be specific, when the service requested by the UE is determined, the corresponding mobility level may be determined from the correspondence between a service and a mobility level based on a type of the service. This may be independently completed, and communication with another device is not required. In the other two implementations, the mobility level is determined by using the SLA sent by the application function, or the mobility level is determined by using the subscription data of the UE. No pre-configuration is required and implementation is more flexible.

The service requested by the UE needs to be determined prior to the mobility level of the service requested by the UE, and determining the service requested by the UE may include:

obtaining the service information requested by the UE; and determining, based on the service information requested by the UE, the service requested by the UE.

In one embodiment, the managing the context based on the effective range of the context includes:

when generating the context of the network resource bearing the service of the UE, using a mobility marker to mark the context of the network resource bearing the service of the UE, where the mobility marker is used to indicate the effective range of the context of the network resource bearing the service of the UE, so that the context of the network resource bearing the service of the UE may be subsequently managed based on the mobility marker of the context, to avoid the problem that continuity of some services with a relatively high continuity requirement is affected because contexts of network resources bearing these services are deleted.

In one embodiment, the mobility marker includes the mobility level of the service and the location information of the UE, and the location information of the UE in the mobility marker is used to indicate a location in which the UE is located when the mobility marker is generated.

In one embodiment, the managing the context based on the effective range of the context further includes:

obtaining updated location information of the UE;

determining, based on the updated location information of the UE and the effective range of the context of the network resource bearing the service of the UE, whether the context of the network resource bearing the service of the UE is invalid; and when the context of the network resource bearing the service of the UE includes an invalid context, deleting the invalid context, and releasing a network resource bearing a service corresponding to the invalid context.

In one embodiment, the managing the context based on the effective range of the context further includes:

obtaining updated location information of the UE;

determining, based on the updated location information and the effective range of the context of the network resource bearing the service of the UE, whether the context of the network resource bearing the service of the UE is invalid; and when the context of the network resource bearing the service of the UE includes a valid context, sending the valid context to a second control plane entity, where the second control plane entity is a control plane entity in an area in which the UE is located after a location of the UE is updated.

In one embodiment, when the control plane entity in the area in which the UE is located after the location of the UE is updated does not change, the obtaining updated location information of the UE includes:

receiving the updated location information of the UE reported by a radio access network node RAN node; or receiving a message of the UE, where the message of the UE carries an identifier of a network node, and determining the updated location information of the UE based on the identifier of the network node; or when the control plane entity in the area in which the UE is located after the location of the UE is updated changes, the obtaining updated location information of the UE includes:

receiving the updated location information of the UE that is added in a context request sent by the second control plane entity; or receiving a context request, where the context request carries an identifier of a network node, and determining the updated location information of the UE based on the identifier of the network node.

In this implementation, when the control plane entity in the area in which the UE is located after the location of the UE is updated does not change or changes, different methods for obtaining the updated location information of the UE are provided, to ensure that the updated location information of the UE can be obtained when the user equipment context is managed.

The network node that forwards a message of the UE may be a RAN node, and a network node that sends a context request may be the second control plane entity.

In one embodiment, the determining, based on the updated location information of the UE and the effective range of the context of the network resource bearing the service of the UE, whether the context of the network resource bearing the service of the UE is invalid includes:

when the location information of the UE is out of the effective range of the context of the network resource bearing the service of the UE, determining that the context of the network resource bearing the service of the UE is invalid; or when the location information of the UE is within the effective range of the context of the network resource bearing the service of the UE, determining that the context of the network resource bearing the service of the UE is valid.

In the foregoing implementations, the effective range of the context is determined first by using the mobility marker in the context, and then whether the context is invalid is determined based on the effective range of the context and the location information of the UE, to avoid a problem that continuity of some services with a relatively high continuity requirement is affected because contexts of network resources bearing these services are deleted.

According to a second aspect, a user equipment context management method is provided, where the method includes:

obtaining, by a second control plane entity, location information of UE;

obtaining an effective range of a context of a network resource bearing a service of the UE; and managing the context based on the location information of the UE and the effective range of the context of the network resource bearing the service of the UE.

In this embodiment of the present invention, when a location of the UE is updated, the second control plane entity determines, based on updated location information of the UE and the effective range of the context of the network resource bearing the service of the UE, whether the context of the network resource bearing the service of the UE is invalid, to manage the context based on the effective range of the context of the network resource bearing the service of the UE in the context, thereby avoiding a problem that continuity of some services with a relatively high continuity requirement is affected because contexts of network resources bearing these services are deleted.

Obtaining the updated location information of the UE includes:

receiving the updated location information of the UE reported by a RAN node.

With reference to the second aspect, in a first implementation of the second aspect, the obtaining an effective range of a context of a network resource bearing a service of the UE includes:

receiving a mobility marker sent by a first control plane entity; and determining, based on the mobility marker, the effective range of the context of the network resource bearing the service of the UE.

With reference to the first implementation of the second aspect, in a second implementation of the second aspect, the mobility marker includes a mobility level of the service and the location information of the UE, and the location information of the UE in the mobility marker is used to indicate a location in which the UE is located when the mobility marker is generated.

In one embodiment, the managing the context based on the location information of the UE and the effective range of the context of the network resource bearing the service of the UE includes:

determining, based on the location information of the UE and the effective range of the context of the network resource bearing the service of the UE, whether the context of the network resource bearing the service of the UE is invalid; and when the context of the network resource bearing the service of the UE includes an invalid context, deleting the invalid context, and releasing a network resource bearing a service corresponding to the invalid context.

According to a third aspect, a user equipment context management apparatus is provided, where the apparatus includes several units, such as a receiving unit, a processing unit, and a sending unit, where the units are configured to implement the method provided in the first aspect.

According to a fourth aspect, a user equipment context management apparatus is provided, where the apparatus includes several units, such as a receiving unit and a processing unit, where the units are configured to implement the method provided in the second aspect.

According to a fifth aspect, a user equipment context management device is provided, where the user equipment context management device includes a processor, a memory, and a communications interface, the memory is configured to store a software program and a module, and by running or executing the software program and/or the module stored in the memory, the processor implements the following operations:

receiving a service request message of user equipment UE, where the service request message includes service information requested by the UE;

obtaining location information of the UE;

determining, based on the service information requested by the UE, a mobility level of a service requested by the UE;

determining, based on the location information of the UE and the mobility level of the service, an effective range of a context of a network resource bearing the service of the UE; and managing the context based on the effective range of the context.

According to a sixth aspect, a user equipment context management device is provided, where the user equipment context management device includes a processor, a memory, and a communications interface, the memory is configured to store a software program and a module, and by running or executing the software program and/or the module stored in the memory, the processor implements the following operations:

obtaining location information of UE;

obtaining an effective range of a context of a network resource bearing a service of the UE; and managing the context based on the location information of the UE and the effective range of the context of the network resource bearing the service of the UE.

According to a seventh aspect, a computer readable storage medium is provided, where the computer readable storage medium is configured to store program code executed by the foregoing processor during service transmission. The program code includes an instruction used for implementing the method provided in the first aspect.

According to an eighth aspect, a computer readable storage medium is provided, where the computer readable storage medium is configured to store program code executed by the foregoing processor during service transmission. The program code includes an instruction used for implementing the method provided in the second aspect.

According to a ninth aspect, a user equipment context management system is provided, where the system includes user equipment and a first control plane entity.

The first control plane entity is configured to: receive a service request message of the user equipment, where the service request message includes service information requested by the user equipment; obtain location information of the user equipment; determine, based on the service information requested by the user equipment, a mobility level of a service requested by the user equipment; determine, based on the location information of the user equipment and the mobility level of the service, an effective range of a context of a network resource bearing the service of the user equipment; and manage the context based on the effective range of the context.

With reference to the ninth aspect, in an implementation of the ninth aspect, the system may further include a second control plane entity; when the user equipment moves and enters a management area range of the second control plane entity, the second control plane entity is configured to: obtain location information of the user equipment; obtain the effective range of the context of the network resource bearing the service of the user equipment; and manage the context based on the location information of the user equipment and the effective range of the context of the network resource bearing the service of the user equipment. The context of the network resource bearing the service of the user equipment managed by the second control plane entity is sent by the first control plane entity to the second control plane entity.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may derive other drawings from these accompanying drawings without creative efforts.

DESCRIPTION OF EMBODIMENTS

Figure 1:
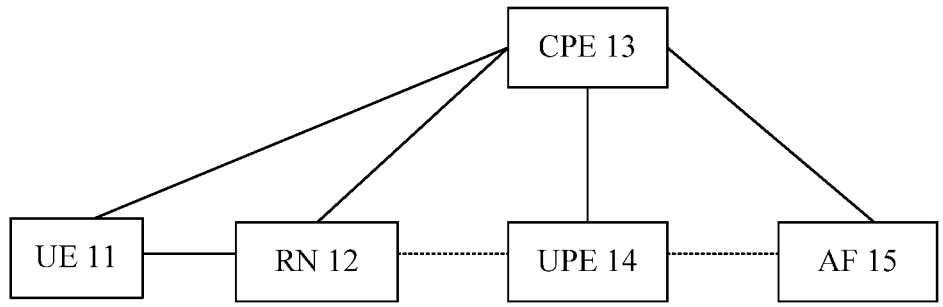
FIG. 1 is a schematic diagram of an application scenario according to an embodiment of the present invention.

To make the objectives, technical solutions, and advantages of the present invention clearer, the following further describes the embodiments of the present invention in detail with reference to the accompanying drawings.

To facilitate understanding of the technical solutions provided in the embodiments of the present invention, an application scenario of the present invention is first described with reference to FIG. 1.

The scenario includes UE 11, a radio access network node (RAN Node, RN for short) 12, a control plane entity (Control Plane Entity, CPE for short) 13, a user plane entity (User Plane Entity, UPE for short) 14, and an application function (Application Function, AF for short) 15. The CPE 13 is separately connected to the UE 11, the RN 12, the UPE 14, and the AF 15, and the UE 11 is connected to the RN 12.

The UE 11 in the present invention may be a 2G/3G/4G terminal, and includes a handheld device having a wireless communication function, an in-vehicle device, a wearable device, a computing device, or another processing device connected to a wireless modem, and UE, a mobile station (Mobile station, MS for short), a terminal, and terminal equipment that are in various forms, and the like. The UE 11 may also be a terminal that supports a 5G network, including but not limited to a machine device, a sensor, a mobile terminal, and the like.

The RN 12 is a node in a radio access network in a general sense, and is responsible for communication between the UE 11 and a core network. The RN 12 may be a base station, a distributed base station, a cloud radio access network (Cloud RAN, CRAN for short) device, an access network device that includes a radio access network controller and a base station, or the like. The foregoing base station may be a conventional 2G/3G/4G base station, or may be a future base station that supports a 5G technology.

The CPE 13 is a control plane in a network 131 deployed in the core network, and is responsible for functions of a terminal, such as session management, identity authentication, and access control. The CPE 13 is an entity that provides a control plane network function in a third Generation Partnership Project (3rd Generation Partnership Project, 3GPP for short) communications system. This entity is responsible for executing the control plane network function and communicating with other external entities or other network function entities through defined interfaces. The control plane entity may be a physical network element such as a mobility management entity (Mobility Management Entity, MME for short) or a serving general packet radio service (General Packet Radio Service, GPRS for short) support node (Serving GPRS Support Node, SGSN for short), or may be a virtual machine, or may even be a software program package.

The UPE 14 is an entity that provides a user plane network function in a 3GPP communications system. The entity is responsible for executing the user plane network function and communicating with other external entities or other network function entities through defined interfaces. The user plane entity may be a physical network element such as a serving gateway (Serving GateWay, S-GW for short) or a PDN gateway (PDN GateWay, P-GW for short), or may be a virtual machine, or may even be a software program package.

The AF 15 is an application function, and may provide a service requirement and a policy that are required by an application to a CPE, such as a service level agreement (Service Level Agreement, SLA for short). Based on the service requirement and the policy, the CPE determines a service policy of UE, such as quality of service (Quality of Service, QoS for short) and charging. The AF 15 may also be an application server, and is configured to provide a service accessed by a user, for example, a QQ server.

When UE moves from one area to another, a location of the UE is updated. If a CPE in an area in which the UE is located before the location of the UE is updated is different from a CPE in an area in which the UE is located after the location of the UE is updated, a context of the UE is transferred from the CPE (denoted as a first CPE below) before the location update to the CPE (denoted as a second CPE below) after the location update.

To resolve a problem existing in the prior art, the embodiments of the present invention provide a user equipment context management device, where the user equipment context management device may be integrated on the foregoing CPE or may be the foregoing CPE. A primary function of the user equipment context management device is to determine a mobility level of a service, and convert the mobility level into a mobility marker and store the mobility marker into a context of a network resource bearing a service of UE, so that when the UE moves, the user equipment context management device can determine, based on the context of the UE, a UE context of a service that can be deleted, and a UE context of a service that needs to be retained, to avoid impact on a service with a high continuity requirement.

Figure 2A:
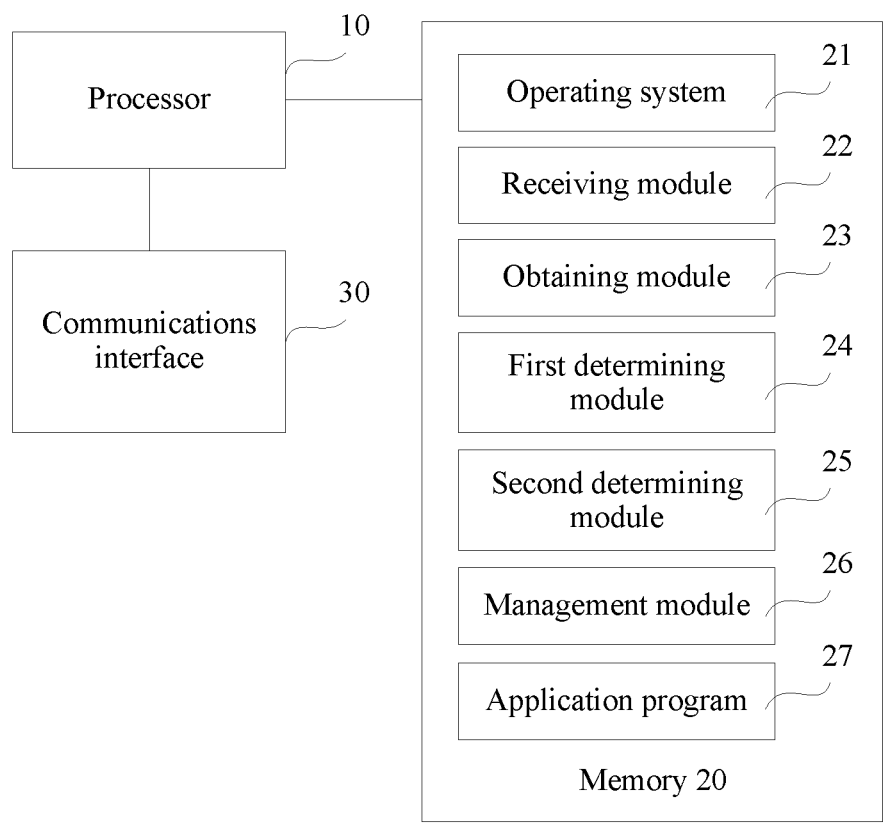
FIG. 2a is a schematic structural diagram of a user equipment context management device according to an embodiment of the present invention.

FIG. 2a is a schematic diagram of a possible hardware structure of a user equipment context management device, where the user equipment context management device may be the CPE in FIG. 1, and is specifically the foregoing first CPE. As shown in FIG. 2a, the user equipment context management device includes a processor 10, a memory 20, and a communications interface 30. A person skilled in the art may understand that, the structure shown in FIG. 2a does not constitute a limitation on the user equipment context management device, and may include more or fewer components than those shown in FIG. 2a, or a combination of some components, or different component arrangements.

The processor 10 is a control center of the user equipment context management device, connects all parts of the entire user equipment context management device by using various interfaces and lines. By running or executing a software program and/or a module stored in the memory 20 and by invoking data stored in the memory 20, the processor 10 performs various functions of the user equipment context management device and processes data, to perform overall control on the user equipment context management device. The processor 10 may be implemented by a CPU, or may be implemented by a network processor (Network Processor, NP for short) with a control plane function.

The memory 20 may be configured to store a software program and a module. By running the software program and the module that are stored in the memory 20, the processor 10 performs various function applications and data processing. The memory 20 may mainly include a program storage area and a data storage area, where the program storage area may store an operating system 21, a receiving module 22, an obtaining module 23, a first determining module 24, a second determining module 25, a management module 26, an application program 27 (for example, mobility level determining) required by at least one function, and the like. The data storage area may store data (for example, a UE context) created based on usage of the user equipment context management device. The memory 20 may be implemented by any type of volatile or non-volatile storage device or a combination thereof, for example, a static random access memory (Static Random Access Memory, SRAM for short), an electrically erasable programmable read-only memory (Electrically Erasable Programmable Read-Only Memory, EEPROM for short), an erasable programmable read-only memory (Erasable Programmable Read Only Memory, EPROM for short), a programmable read-only memory (Programmable Read-Only Memory, PROM for short), a read-only memory (Read Only Memory, ROM for short), a magnetic storage, a flash memory, a magnetic disk, or an optical disc. Correspondingly, the memory 20 may further include a memory controller, to provide the processor 10 with access to the memory 20.

The processor 20 performs the following function by running the receiving module 22: receiving a service request message of user equipment UE by using the communications interface 30, where the service request message includes service information requested by the UE. The processor 20 performs the following function by running the obtaining module 23: obtaining location information of the UE. The processor 20 performs the following function by running the first determining module 24: determining, based on the service information requested by the UE, a mobility level of a service requested by the UE. The processor 20 performs the following function by running the second determining module 25: determining, based on the location information of the UE and the mobility level of the service, an effective range of a context of a network resource bearing the service of the UE. The processor 20 performs the following function by running the management module 26: managing the context based on the effective range of the context.

Figure 2B:
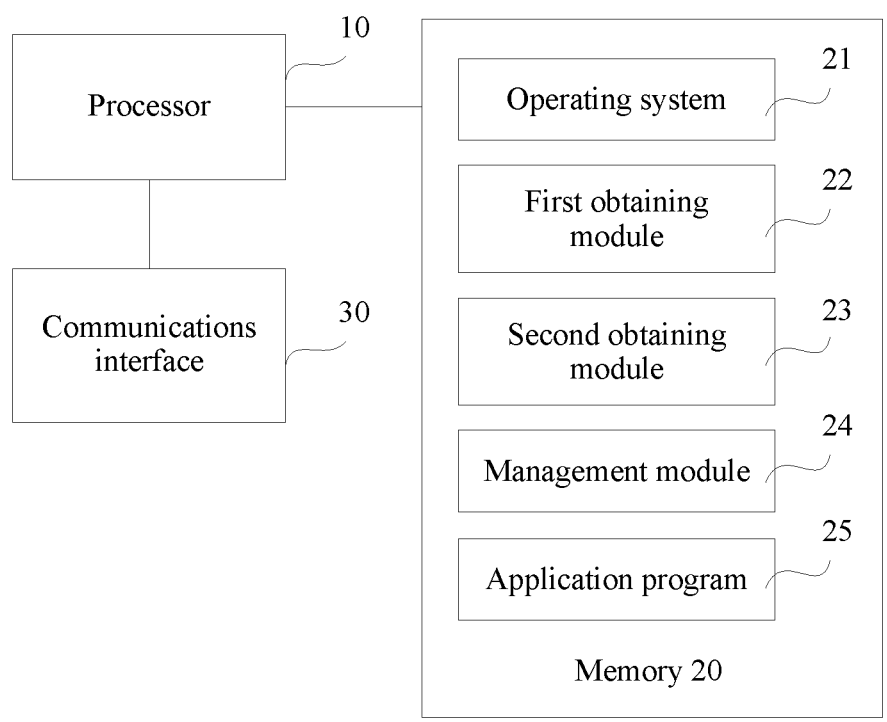
FIG. 2b is a schematic structural diagram of a user equipment context management device according to an embodiment of the present invention.

FIG. 2b is a schematic diagram of another possible hardware structure of a user equipment context management device, where the user equipment context management device may be the CPE in FIG. 1, and is specifically the foregoing second CPE. As shown in FIG. 2b, the user equipment context management device includes a processor 10, a memory 20, and a communications interface 30. A person skilled in the art may understand that, the structure shown in FIG. 2b does not constitute a limitation on the user equipment context management device, and may include more or fewer components than those shown in FIG. 2b, or a combination of some components, or different component arrangements.

The processor 10 is a control center of the user equipment context management device, connects all parts of the entire user equipment context management device by using various interfaces and lines. By running or executing a software program and/or a module stored in the memory 20 and by invoking data stored in the memory 20, the processor 10 performs various functions of the user equipment context management device and processes data, to perform overall control on the user equipment context management device. The processor 10 may be implemented by a CPU, or may be implemented by an NP with a control plane function.

The memory 20 may be configured to store a software program and a module. By running the software program and the module that are stored in the memory 20, the processor 10 performs various function applications and data processing. The memory 20 may mainly include a program storage area and a data storage area, where the program storage area may store an operating system 21, a first obtaining module 22, a second obtaining module 23, a management module 24, an application program 25 (for example, mobility level determining) required by at least one function, and the like. The data storage area may store data (for example, a UE context) created based on usage of the user equipment context management device. The memory 20 may be implemented by any type of volatile or non-volatile storage device or a combination thereof, such as an SRAM, an EEPROM, an EPROM, a PROM, a ROM, a magnetic storage, a flash memory, a magnetic disk, or an optical disc. Correspondingly, the memory 20 may further include a memory controller, to provide the processor 10 with access to the memory 20.

The processor 20 performs the following function by running the first obtaining module 22: obtaining location information of UE. The processor 20 performs the following function by running the second obtaining module 23: obtaining an effective range of a context of a network resource bearing a service of the UE. The processor 20 performs the following function by running the management module 24: managing the context based on the location information of the UE and the effective range of the context of the network resource bearing the service of the UE.

Figure 3:
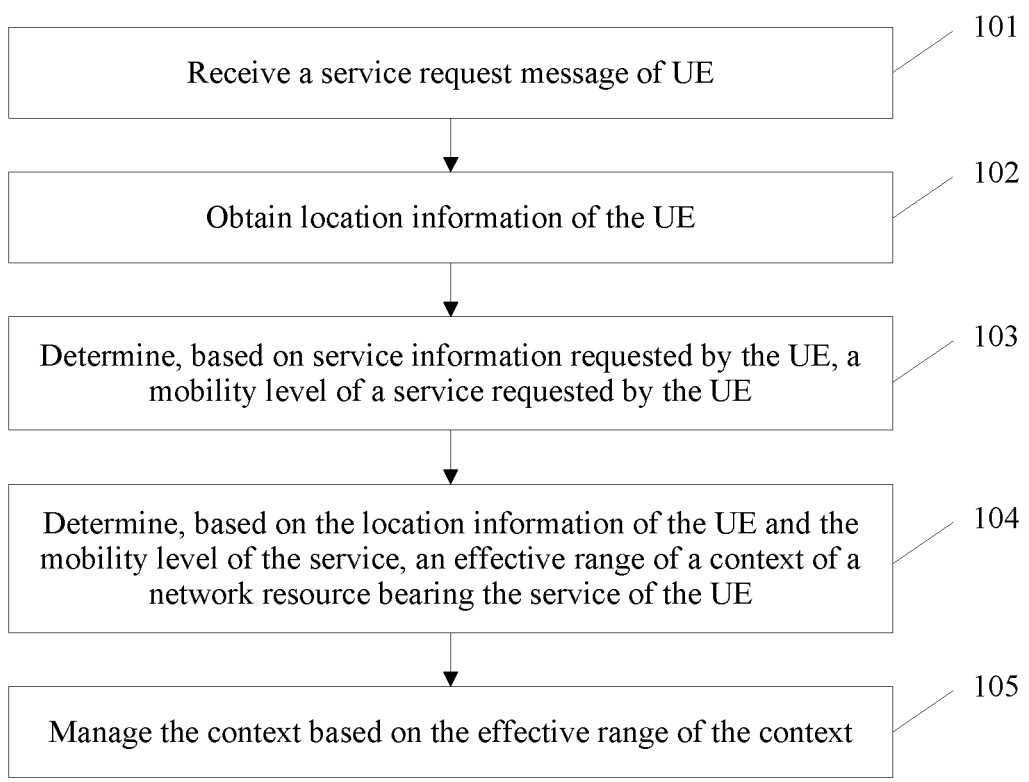
FIG. 3 is a flowchart of a user equipment context management method according to an embodiment of the present invention.

FIG. 3 is a flowchart of a user equipment context management method according to an embodiment of the present invention. The method may be performed by the user equipment context management device (that the user equipment context management device is the foregoing CPE is used as an example, and the user equipment context management device is specifically the foregoing first CPE) in the foregoing application scenario. As shown in FIG. 3, the method includes the following operations.

Operation 101: Receive a service request message of UE, where the service request message includes service information requested by the UE.

The service request message of the UE includes the service information required by the UE, and the service information is a business/service that the UE expects to obtain this time. The service information requested by the UE includes but is not limited to an APN that needs to be accessed by a service of the UE, a service type corresponding to the service of the UE, and an application server domain name/Internet Protocol (Internet Protocol, IP for short) address that needs to be accessed by the service of the UE.

The UE may request, based on a requirement of the UE, a plurality of different services from the CPE, for example, a voice service and a video service.

Operation 102: Obtain location information of the UE.

The location information of the UE includes but is not limited to cell location information (for example, an evolved Universal Mobile Telecommunications System (Universal Mobile Telecommunications System, UMTS for short) terrestrial radio access network (UMTS Terrestrial Radio Access Network, E-UTRAN for short) cell global identifier (E-UTRAN Cell Global Identifier, ECGI for short)), RN identification information, tracking area information (for example, a tracking area identity (Tracking Area identity, TAI for short)), and access technology information (for example, the UE is currently located in a 4G cell or a 5G cell).

Operation 103: Determine, based on the service information requested by the UE, a mobility level of a service requested by the UE.

The mobility level is used to indicate a range in which continuity of the service requested by the UE needs to be maintained. The mobility level of the service is indicated by using an area range or an access technology. The area range may be a cell or a registration area (for example, a tracking area list). The access technology may be a 3GPP access technology, or a Long Term Evolution (Long Term Evolution, LTE for short) or 5G access technology, or the like. For example, if the mobility level of the service is a cell range, it indicates that service continuity of the service needs to be maintained only in a range of one cell. Alternatively, if the mobility level of the service is a 3GPP access technology range, it indicates that service continuity should be maintained when the service is switched between any 3GPP access technologies. However, when the service is switched between a 3GPP access technology and a non-3GPP access technology, the service continuity may not need to be ensured.

Operation 104: Determine, based on the location information of the UE and the mobility level of the service, an effective range of a context of a network resource bearing the service of the UE.

The effective range is used to indicate a range in which the context (referred to as context below) of the network resource bearing the service of the UE needs to be retained, for example, a specified cell. If the UE moves out of the effective range, the CPE no longer retains the context or no longer sends the context to a new CPE, and notifies a user plane entity UPE of releasing the network resource corresponding to the context. An effective range is determined by both a UE location and a mobility level. To be specific, the UE location specifies a center location of the effective range, and the mobility level specifies a size of the effective range. For example, if the UE is currently located in a cell 1 of an RN A and the mobility level of the service of the UE is a cell level, the effective range of the context of the network resource bearing the service of the UE is a range of the cell 1.

The network resource bearing the service is a network resource allocated to bear the service of the UE, for example, a PDN connection, a bearer (Bearer), or an IP flow (IP flow). The context corresponding to the network resource bearing the service of the UE is a context that can uniquely identify and describe the network resource, and may include information such as a bearer identifier of a bearer and a tunnel endpoint identifier (Tunnel Endpoint ID, TED for short).

In this embodiment of the present invention, the effective range of the context of the network resource bearing the service of the UE may be added in the foregoing context, for example, a mobility marker described below. Certainly, the foregoing effective range may also be independently stored in the user equipment context management device in a table or another form. The foregoing operations 101 to 104 may be repeatedly performed, to obtain effective ranges of contexts of network resources bearing different services of the UE.

The following describes operations 101 to 104 by using an example. The CPE obtains current cell information ECGI of the UE. The CPE determines, based on the service information requested by the UE, that the mobility level of the network resource bearing the service is a cell level (in other words, service continuity of the service is ensured only in a cell). The CPE determines, based on the current cell information ECGI of the UE and the mobility level, that the effective range of the context of the network resource bearing the service of the UE is effective only in a cell currently connected to the UE. If the UE moves and causes a cell handover, the context is invalid, and the CPE no longer retains the context, and needs to notify a user plane entity UPE of releasing the network resource bearing the service (by using a bearer release procedure, for example, by using a delete bearer request message, the CPE may notify the UPE of releasing the network resource). Certainly, the mobility level may be a radio access network node level, a tracking area list level, or the like. In this case, if the UE moves out of a current radio access network node or moves out of a current tracking area list, the context becomes invalid.

Operation 105: Manage the context based on the effective range of the context.

Managing the context may include deleting or transferring the context.

In this embodiment of the present invention, the location information of the UE is obtained, the mobility level of the service requested by the UE is determined, and the effective range of the context of the network resource bearing the service of the UE is further determined, so that during context management, a network may manage the context of the UE based on the effective range of the context of the network resource bearing the service of the UE (for example, choose whether to delete or transfer the context), to avoid a problem that continuity of some services with a relatively high continuity requirement is affected because contexts of network resources bearing these services are deleted.

Figure 4:
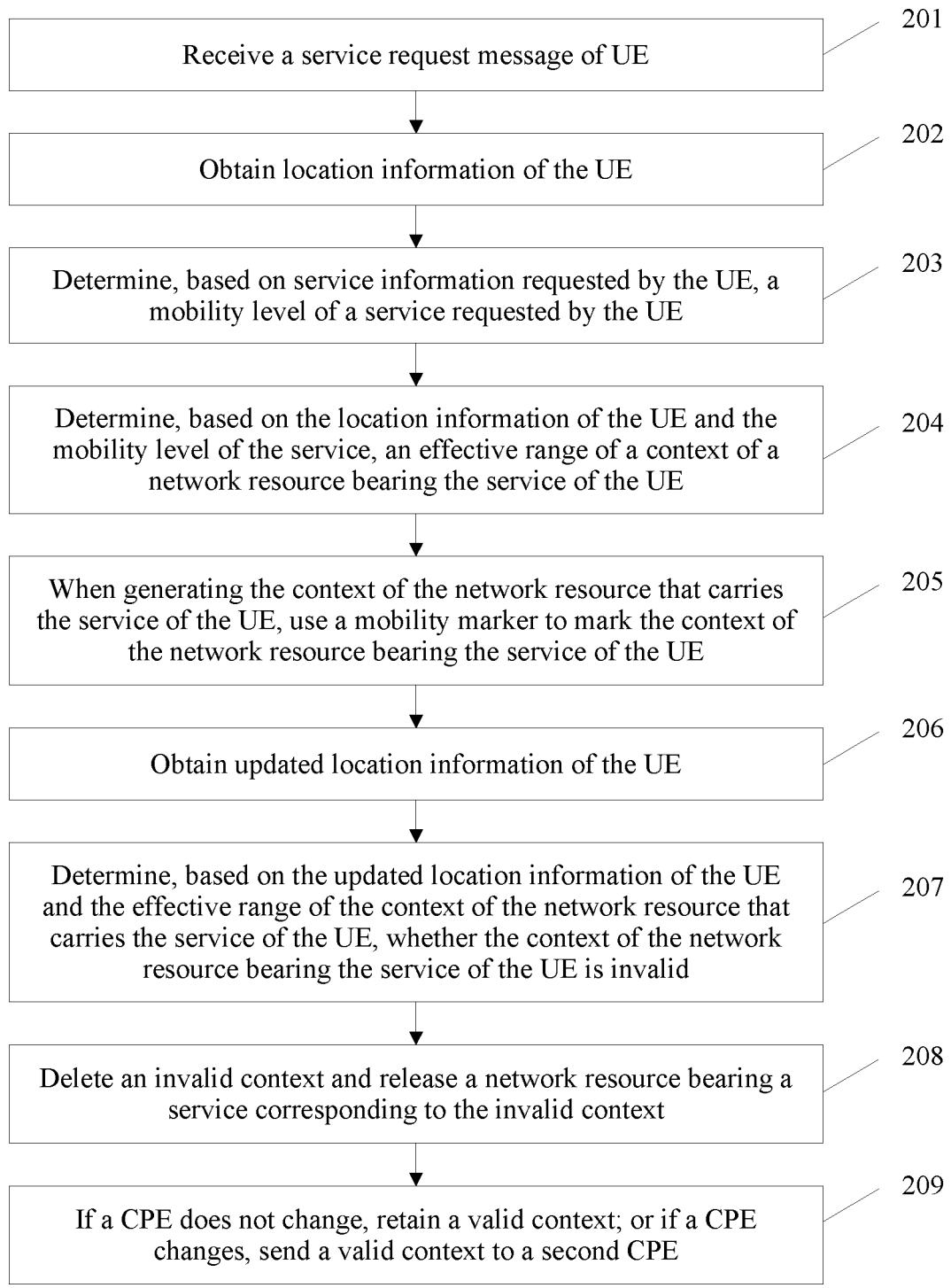
FIG. 4 is a flowchart of another user equipment context management method according to an embodiment of the present invention.

FIG. 4 is a flowchart of a user equipment context management method according to an embodiment of the present invention. The method may be performed by the user equipment context management device (that the user equipment context management device is the foregoing CPE is used as an example, and the user equipment context management device is specifically the foregoing first CPE) in the foregoing application scenario. The user equipment context management method provided in FIG. 4 is a detailed description of the user equipment context management method provided in FIG. 3. As shown in FIG. 4, the method includes the following operations.

Operation 201: Receive a service request message of UE, where the service request message includes service information requested by the UE.

Specifically, determining a service requested by the UE may include the following operations:

Operation 1: Receive a service request sent by the UE.

Specifically, the CPE receives the service request that is sent by the UE and that is forwarded by an RN.

Figure 4A:
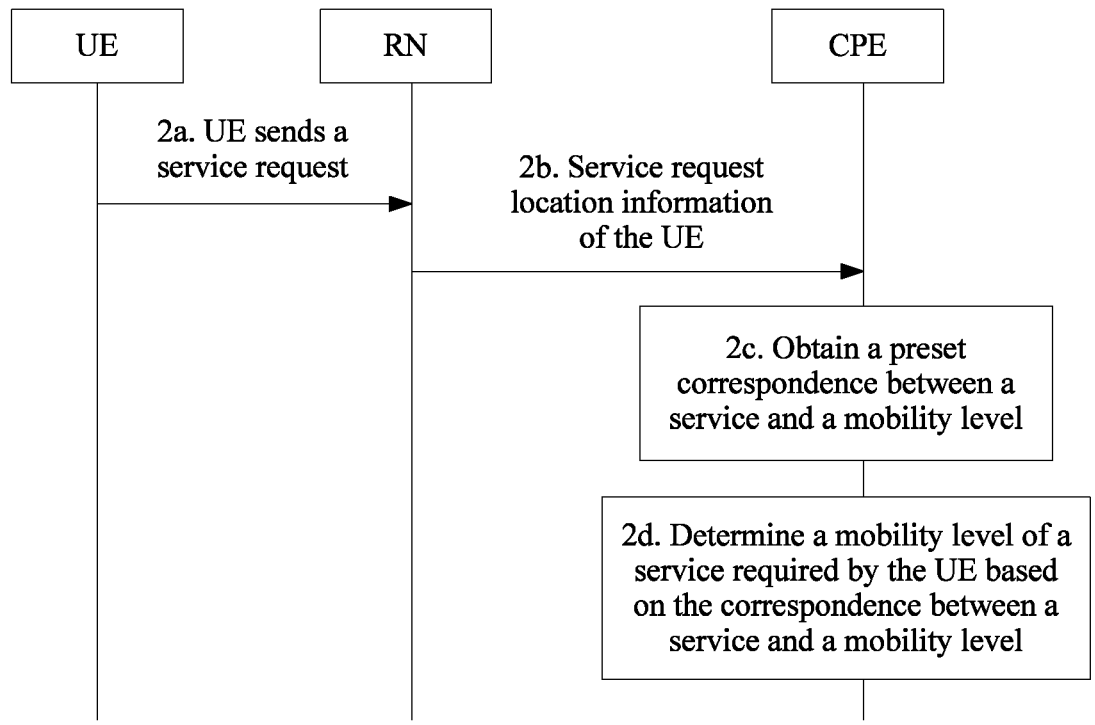
FIG. 4a to FIG. 4d are flowcharts of some operations in another user equipment context management method according to an embodiment of the present invention.

As shown in FIG. 4a, in operation 2a, the UE sends a service request to an RN; in operation 2b, the RN forwards the service request to the CPE, and when forwarding the service request, the RN may simultaneously send location information of the UE to the CPE.

The service request message of the UE includes the service information required by the UE, and the service information is a business/service that the UE expects to obtain this time. The service information requested by the UE includes but is not limited to an APN that needs to be accessed by a service of the UE, a service request type (Service Type) corresponding to the service of the UE, and an application server domain name/IP address that needs to be accessed by the service of the UE. The service request type may be a service identifier, a service type, or an identifier of a service type. The service identifier is an identifier that can be used to specifically identify a service name, for example, specific services such as a voice service over LTE (Voice over LTE, VoLTE for short) based on an Internet Protocol multimedia subsystem (IP Multimedia Subsystem, IMS for short), a short message service (Short Message Service, SMS for short), and a high-definition video (Video) service may respectively correspond to identifiers 1, 2, and 3. The service type is used to identify one or more services with a similar requirement or a combination of services with a similar application scenario, such as a mobile broadband (Mobile Broadband, MBB for short) service, an Internet of Things (Internet Of Things, IoT for short) service, and a key communications service. The identifier of a service type is an identifier used to identify the service type, for example, an MBB service and an IoT service may be identified by using values 1 and 2 of a field.

Operation 2: Determine, based on the service information, a service requested by the UE.

Specifically, the service requested by the UE is determined based on the service information such as an APN, an IP address, and a service type in the service information.

Operation 202: Obtain location information of the UE.

Operation 202 may include receiving the location information of the UE sent by the RN. The location information of the UE includes but is not limited to cell location information (for example, an E-UTRAN cell global identifier (ECGI)), RN identification information, tracking area information (for example, a tracking area identity (TAI)), and access technology information (for example, the UE is currently located in a 4G cell or a 5G cell).

The foregoing operations 201 and 202 may be completed simultaneously because when forwarding the service request of the UE to the CPE, the RN may send the location information of the UE at the same time, as shown in FIG. 4a.

Operation 203: Determine, based on the service information requested by the UE, a mobility level of a service requested by the UE.

In one embodiment, as shown in FIG. 4a, operation 203 may include the following:

Operation 1 (operation 2c in FIG. 4a): Obtain a preset correspondence between a service and a mobility level.

The correspondence between a service and a mobility level may be preconfigured by a network operator on the CPE.

For example, a mobility level of a local video streaming service may be limited to one or more RNs. For another example, a mobility level of a VoLTE voice call service may be limited to a plurality of access types, for example, 4G and 5G In other words, based on different scenarios and requirements of a service, the mobility level specifies a range in which continuity of the service needs to be ensured by a network. Certainly, a larger range indicates more complex signaling and a more complex procedure that need to be implemented on a network side. Therefore, mobility levels need to be differentiated based on different services, to reduce complexity of the network.

Operation 2 (operation 2d in FIG. 4a): Determine, based on the service information requested by the UE and the correspondence between a service and a mobility level, the mobility level of the service requested by the UE.

The service requested by the UE may be determined based on the service information requested by the UE. For details, refer to operation 201.

Figure 4B:
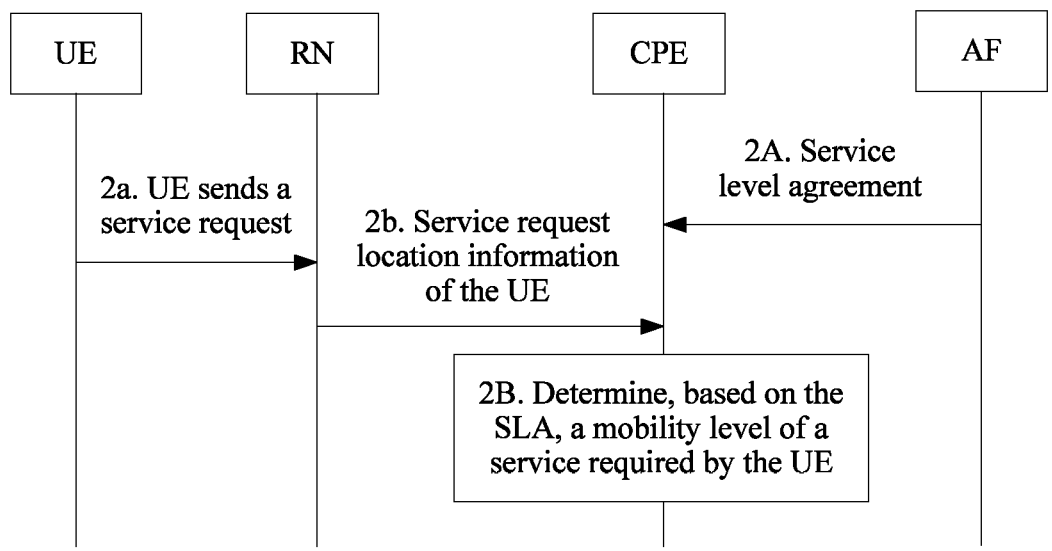

In another embodiment, as shown in FIG. 4b, operation 203 may include the following:

Operation 1 (operation 2A in FIG. 4b): Obtain an SLA sent by an application function, where the SLA includes a correspondence between a service and a mobility level.

Operation 2 (operation 2B in FIG. 4b): Determine, based on the service information requested by the UE and the SLA, the mobility level of the service requested by the UE.

The SLA is a service agreement between a user and a service provider, and specifies a forwarding service level that is deserved by the user.

The forwarding service level is used to describe a service that can be provided by the application function and a network requirement of each service. If the UE needs to use a service, a 3GPP network needs to provide a corresponding service level for the UE.

Generally, the application function reports, to the CPE before providing a formal service, the SLA of the service that can be provided by the application function. Certainly, the application function also allows a dynamic update of the SLA.

In this implementation, the CPE determines, based on the service level agreement reported by the application function, the mobility level of the service requested by the UE. Compared with the implementation with the correspondence between a service and a mobility level pre-configured, this implementation is more flexible and accurate.

In another embodiment, operation 203 may include the following:

Operation 1: Obtain subscription data of the UE, where the subscription data includes a correspondence between a service and a mobility level.

Operation 2: Determine, based on the service information requested by the UE and the subscription data of the UE, the mobility level of the service requested by the UE.

The subscription data of the UE may be obtained from a home subscriber server (Home Subscriber Server, HSS for short).

In this implementation, the CPE determines, by obtaining the subscription data of the UE from the HSS, the mobility level of the service requested by the UE. Compared with the implementation with the correspondence between a service and a mobility level pre-configured, this implementation is more flexible and accurate.

Operation 204: Determine, based on the location information of the UE and the mobility level of the service, an effective range of a context of a network resource bearing the service of the UE.

Operation 205: When generating the context of the network resource bearing the service of the UE, use a mobility marker to mark the context of the network resource bearing the service of the UE, where the mobility marker is used to indicate the effective range of the context of the network resource bearing the service of the UE.

The mobility marker may include the mobility level of the service and the location information of the UE, and the location information of the UE in the mobility marker is used to indicate a location in which the UE is located when the mobility marker is generated. The mobility marker may include the mobility level of the service and an access technology of the UE, and the access technology of the UE in the mobility marker is used to indicate an access technology of the UE used when the mobility marker is generated. For example, a mobility level of a service included in a mobility marker is a cell level, and a cell location of UE is Cell_A, and an effective range of a context indicated by the mobility marker is within a range of the cell Cell_A. When a current location of the UE is out of the range of the cell, Cell_A, the context is invalid. As another example, a mobility level of a service included in a mobility marker is a 3GPP access technology level, and an access technology of the UE is LTE; in this case, an effective range of a context indicated by the mobility marker is all 3GPP access technologies, including UMTS, LTE, eLTE, a new access technology of 3GPP fifth-generation mobile communications (5th-Generation, 5G for short), and the like. When the UE is connected to a network by using another non-3GPP access technology, such as a Wireless Fidelity (Wireless Fidelity, WiFi for short) technology, the context is invalid.

Operation 205 may include the following:

Operation 1: Allocate, to the service, the network resource bearing the service.

Operation 2: When generating the context of the network resource bearing the service of the UE, use the mobility marker to mark the context of the network resource bearing the service of the UE.

The CPE processes the service request of the UE, allocates, between the CPE and a UPE, the network resource bearing the service, and generates the context corresponding to the network resource.

Using the mobility marker to mark the context of the network resource bearing the service of the UE may be adding the mobility marker to an original context, and the context obtained after the mobility marker is added may be in the following format:

| Mobility marker (mobility marker) | | UE context |
|---|---|---|
| Mobility Level_cell | Current Loc: cell ID | (UE context, identifying and describing a network resource bearing a service) |

In the mobility marker shown in the foregoing table, the mobility level is a cell level, and the location information is a cell ID.

When the location of the UE is updated, the method further includes operation 206 to operation 209.

Operation 206: Obtain updated location information of the UE.

When a CPE in an area in which the UE is located after the location of the UE is updated does not change (that is, the CPE is still the first CPE), the obtaining updated location information of the UE may include:

receiving the updated location information of the UE reported by a radio access network node RN; or receiving a message of the UE, where the message of the UE carries an identifier of a network node, and determining the updated location information of the UE based on the identifier of the network node; or when a CPE in an area in which the UE is located after the location of the UE is updated changes (that is, the CPE is changed to a second CPE), the obtaining updated location information of the UE may include:

receiving the updated location information of the UE that is added in a context request sent by the second CPE; or receiving a context request, where the context request carries an identifier of a network node, and determining the updated location information of the UE based on the identifier of the network node.

For example, it is determined, based on an ID of an RN that forwards a message of the UE, whether the UE reaches a service range of another RN, or it is determined, based on an ID of a CPE that sends a context request, whether the UE reaches a service range of another network node.

When the first CPE receives the context request sent by the second CPE, it indicates that the UE has moved out of a management range of the first CPE and entered a management range of the second CPE. In this case, the first CPE needs to send, to the second CPE, the context of the network resource bearing the service of the UE. For details, refer to operations 207 to 209.

Operation 207: Determine, based on the updated location information of the UE and the effective range of the context of the network resource bearing the service of the UE, whether the context of the network resource bearing the service of the UE is invalid; and when the context of the network resource bearing the service of the UE includes an invalid context, perform operation 208; or when the context of the network resource bearing the service of the UE includes a valid context, perform operation 209.

The determining, based on the updated location information of the UE and the effective range of the context of the network resource bearing the service of the UE, whether the context of the network resource bearing the service of the UE is invalid includes:

when the location information of the UE is out of the effective range of the context of the network resource bearing the service of the UE, determining that the context of the network resource bearing the service of the UE is invalid; or when the location information of the UE is within the effective range of the context of the network resource bearing the service of the UE, determining that the context of the network resource bearing the service of the UE is valid.

In this embodiment of the present invention, the first CPE may determine only an invalid context of the UE, or may determine only a valid context of the UE, or may determine both an invalid context and a valid context of the UE.

Specifically, operation 207 may separately determine, based on effective ranges of contexts of network resources bearing services of the UE, which context corresponding to a service is valid and which context corresponding to a service is invalid, so as to determine a subsequent processing manner of the context of each service.

For example, it is determined, based on the context of the network resource bearing the service of the UE, that the effective range is within a service range of an RN previously connected to the UE. In this case, if the updated location information of the UE indicates that the UE has moved to a service range of another RN, it may be determined that the UE moves out of the effective range of the context, and the context of the network resource is invalid.

For another example, when the UE moves from a current cell to another cell, and the CPE receives new ECGI information reported by the RN, the CPE needs to perform a validity check on the currently stored context of the network resource bearing the service of the UE. The CPE checks whether a cell ID in the new ECGI is beyond the effective range of the context of the network resource bearing the service of the UE. If the cell ID in the new ECGI is not beyond the effective range, the context of the network resource bearing the service of the UE is valid. If the cell ID in the new ECGI is beyond the effective range, the context of the network resource bearing the service is invalid.

The foregoing service is any service, for example, a voice service, a video service, or the like.

Figure 4C:
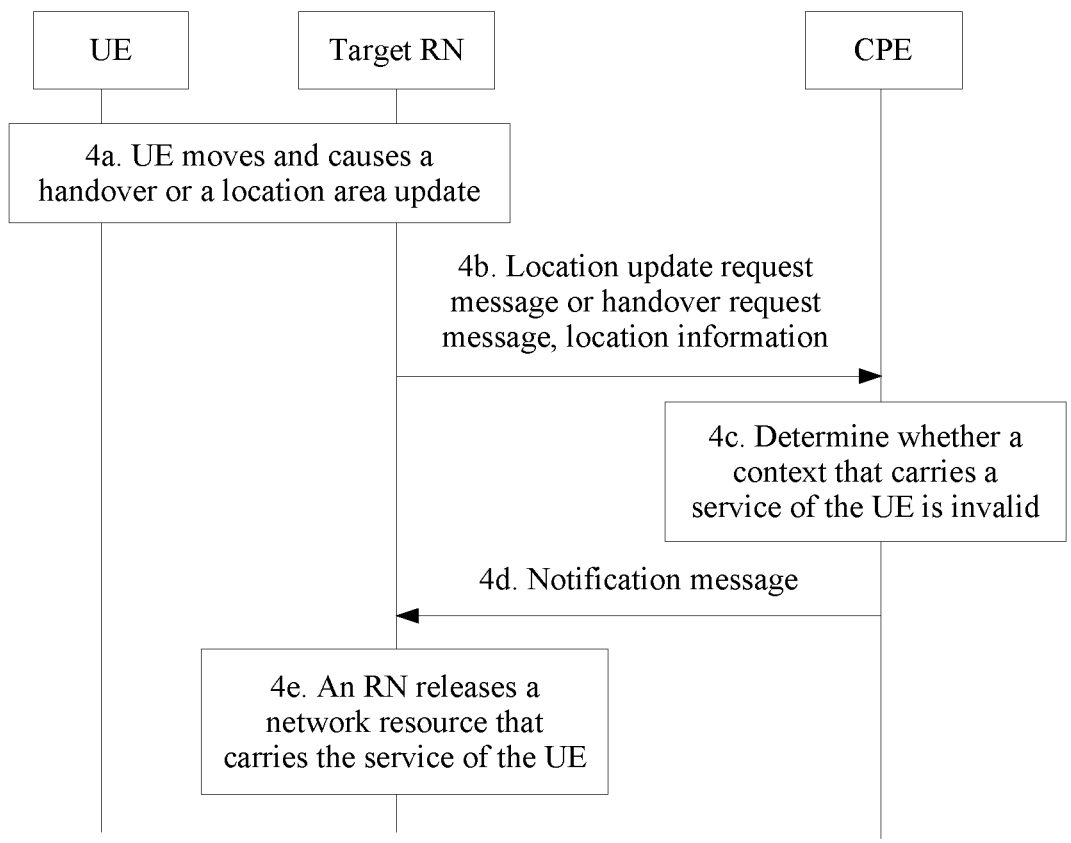

In an implementation in this embodiment of the present invention, when the UE moves and causes a handover or a location area update, if the CPE does not change, the CPE determines, based on location information reported by a target RN and with reference to the mobility marker information, whether the context of the network resource bearing the service of the UE is invalid. As shown in FIG. 4c, the following is specifically included: Operation 4a: The UE moves and causes a handover or a location area update. Operation 4b: A target RN sends a location update request message (or a handover request message) and location information to the CPE. Operation 4c: The CPE determines, based on the location information reported by the target RN and with reference to the effective range of the context of the network resource bearing the service of the UE, whether the context of the network resource bearing the service of the UE is invalid. The target RN is an RN in an area in which the UE is located after the UE moves and causes the handover or the location area update.

Figure 4D:
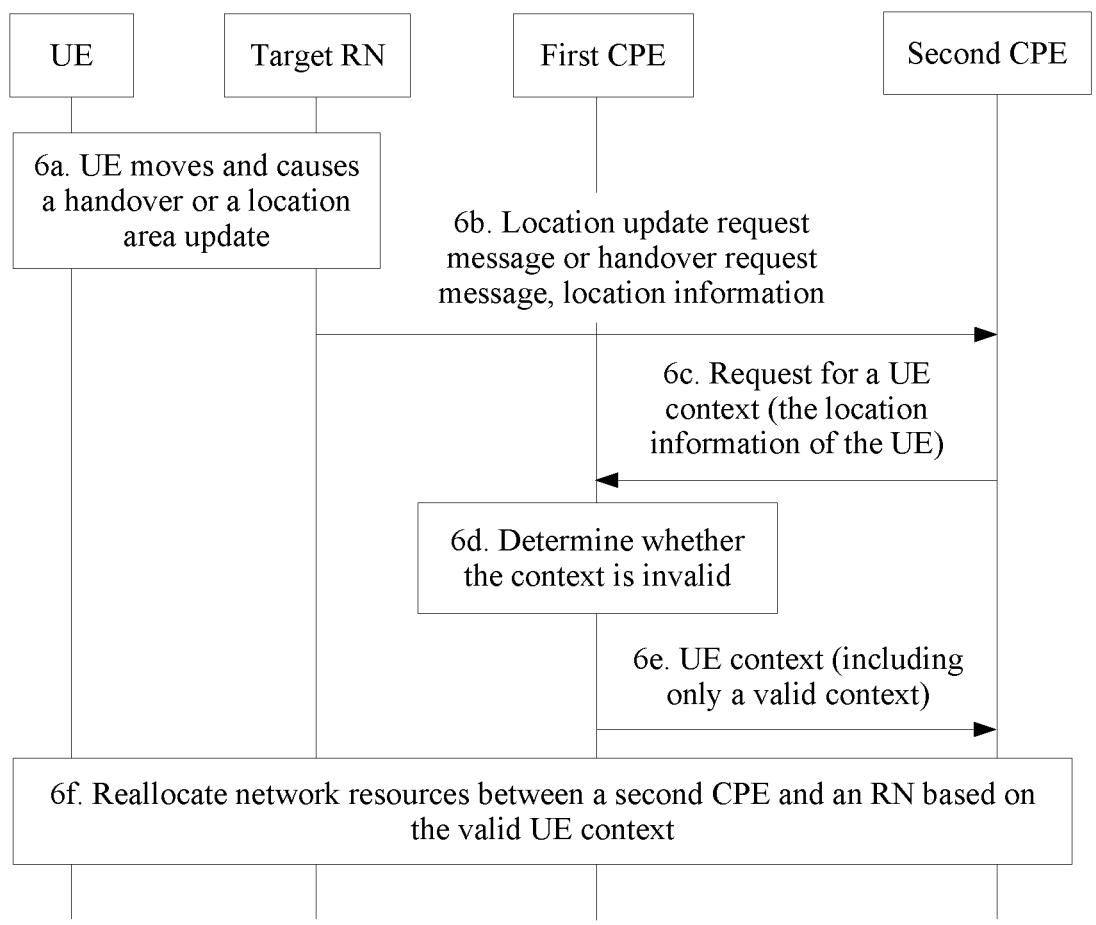

In another embodiment of the present invention, when the UE moves and causes a handover or a location area update, if the CPE changes, the second CPE sends a request message to the first CPE to request for the UE context of the network resource bearing the service of the UE, where the request message carries updated location information of the UE. The first CPE determines, based on the updated location information of the UE, whether the context of the network resource bearing the service is invalid. As shown in FIG. 4d, the following is specifically included: Operation 6a: The UE moves and causes a handover or a location area update. Operation 6b: A target RN sends a location update request message (or a handover request message) and location information to the second CPE. Operation 6c: The second CPE sends a request message to the first CPE, where the request message includes the updated location information of the UE. Operation 6d: The first CPE determines, based on the updated location information of the UE, whether the context of the network resource bearing the service is invalid. The target RN is an RN in an area in which the UE is located after the UE moves and causes the handover or the location area update.

When the mobility level of the service included in the mobility marker is an access technology level, the first CPE does not need to obtain the updated location information of the UE, and directly determines, based on an updated access technology of the UE, whether the context is invalid.

Operation 208: Delete the invalid context and release a network resource bearing a service corresponding to the invalid context.

Further, the releasing a network resource bearing a service corresponding to the invalid context includes: sending a notification message to the RN, where the notification message is used to instruct the RN to release the network resource bearing the service corresponding to the invalid context. The CPE notifies the target RN of the invalid context, so that the target RN releases the corresponding network resource, as shown in operations 4d and 4e in FIG. 4c.

When an invalid context is determined, a corresponding network resource is released, to avoid retaining an unnecessary network resource, thereby improving network resource utilization.

Operation 209: If a CPE does not change, retain the valid context; or if the CPE changes, send the valid context to the second CPE, where the second CPE is a CPE in an area in which the UE is located after a location of the UE is updated.

The context of the UE includes a session context, a mobility management context, a security management context, and the like. A context (for example, a bearer context) of a network resource bearing a first service is included in a session context.

As shown in operation 6e in FIG. 4d, the first CPE sends the valid context of the UE to the second CPE. Network resources are re-allocated between the second CPE and the RN based on the valid context of the UE, as shown in operation 6f, and after operation 209, the first CPE deletes the UE context of the UE.

This embodiment of the present invention provides a user equipment context management method, so that a network may selectively delete or transfer a context when UE moves, thereby reducing network overheads, improving handover efficiency, and implementing on-demand mobility.

Figure 5:
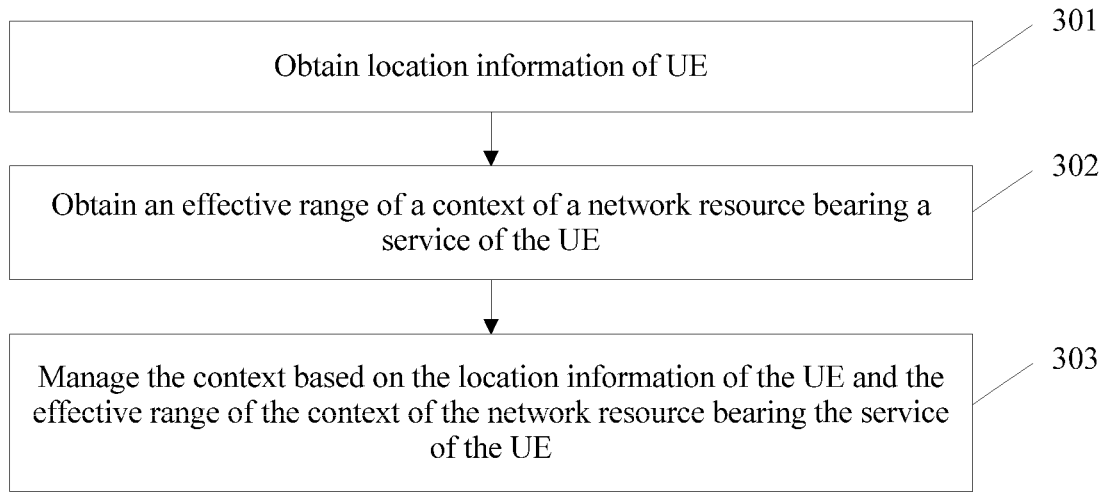
FIG. 5 is a flowchart of a user equipment context management method according to an embodiment of the present invention.

FIG. 5 is a flowchart of a user equipment context management method according to an embodiment of the present invention. The method may be performed by the user equipment context management device (that the user equipment context management device is the foregoing CPE is used as an example, and the user equipment context management device is specifically the foregoing second CPE) in the foregoing application scenario. As shown in FIG. 5, the method includes the following operations.

Operation 301: Obtain location information of UE.

The location information of the UE includes but is not limited to cell location information (for example, an ECGI), RN identification information, tracking area information (for example, a TAI), and access technology information (for example, the UE is currently located in a 4G cell or a 5G cell).

Operation 302: Obtain an effective range of a context of a network resource bearing a service of the UE.

The effective range is used to indicate a range in which the context (referred to as context below) of the network resource bearing the service of the UE needs to be retained, for example, a specified cell. If the UE moves out of the effective range, the CPE no longer retains the context or on longer sends the context to a new CPE, and notifies a user plane entity UPE of releasing the network resource corresponding to the context. An effective range is determined by both a UE location and a mobility level. To be specific, the UE location specifies a center location of the effective range, and the mobility level specifies a size of the effective range. For example, if the UE is currently located in a cell 1 of an RN A and a mobility level of the service of the UE is a cell level, the effective range of the context of the network resource bearing the service of the UE is a range of the cell 1.

The network resource bearing the service is a network resource allocated to bear the service of the UE, for example, a PDN connection, a bearer, or an IP flow. The context corresponding to the network resource bearing the service of the UE is a context that can uniquely identify and describe the network resource, and may include information such as a bearer identifier of a bearer and a TEID.

In this embodiment of the present invention, the effective range of the context of the network resource bearing the service of the UE may be added in the foregoing context, for example, a mobility marker described below. Certainly, the foregoing effective range may also be stored in the user equipment context management device in a table or another form.

Operation 303: Manage the context based on the location information of the UE and the effective range of the context of the network resource bearing the service of the UE.

In this embodiment of the present invention, the location information of the UE is obtained, the mobility level of the service requested by the UE is determined, and the effective range of the context of the network resource bearing the service of the UE is further determined, so that during context management, a network may manage the context of the UE based on the effective range of the context of the network resource bearing the service of the UE (for example, choose whether to delete the context), to avoid a problem that continuity of some services with a relatively high continuity requirement is affected because contexts of network resources bearing these services are deleted.

Figure 6:
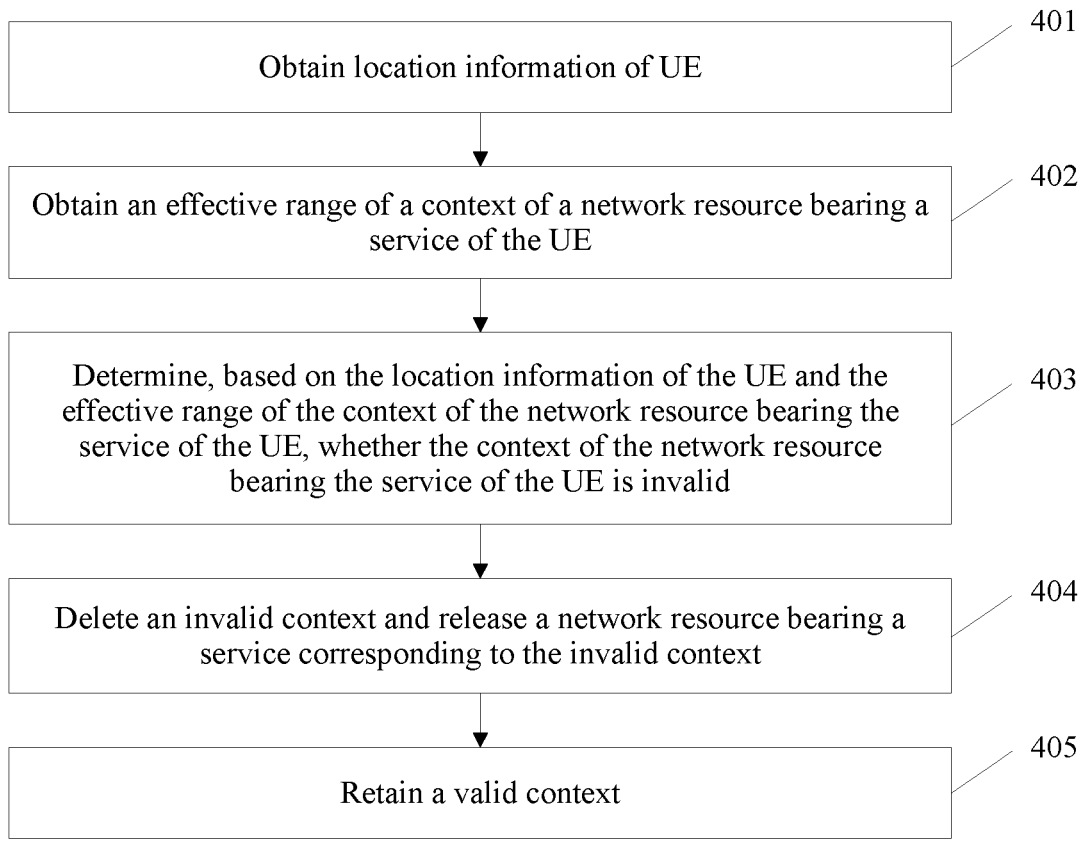
FIG. 6 is a flowchart of another user equipment context management method according to an embodiment of the present invention.

FIG. 6 is a flowchart of a user equipment context management method according to an embodiment of the present invention. The method may be performed by the user equipment context management device (that the user equipment context management device is the foregoing CPE is used as an example, and the user equipment context management device is specifically the foregoing second CPE) in the foregoing application scenario. The user equipment context management method provided in FIG. 6 is a detailed description of the user equipment context management method provided in FIG. 5. As shown in FIG. 6, the method includes the following operations.

Operation 401: Obtain location information of UE.

The location information of the UE includes but is not limited to cell location information (for example, an ECGI), RN identification information, tracking area information (for example, a TAI), and access technology information (for example, the UE is currently located in a 4G cell or a 5G cell).

Operation 401 may include: receiving the location information of the UE sent by an RN; or receiving a message of the UE, where the message of the UE carries an identifier of a network node, and determining updated location information of the UE based on the identifier of the network node.

Operation 402: Obtain an effective range of a context of a network resource bearing a service of the UE.

The effective range is used to indicate a range in which the context (referred to as context below) of the network resource bearing the service of the UE needs to be retained, for example, a specified cell. If the UE moves out of the effective range, the CPE no longer retains the context or on longer sends the context to a new CPE, and notifies a user plane entity UPE of releasing the network resource corresponding to the context. An effective range is determined by both a UE location and a mobility level. To be specific, the UE location specifies a center location of the effective range, and the mobility level specifies a size of the effective range. For example, if the UE is currently located in a cell 1 of an RN A and a mobility level of the service of the UE is a cell level, the effective range of the context of the network resource bearing the service of the UE is a range of the cell 1.

The network resource bearing the service is a network resource allocated to bear the service of the UE, for example, a PDN connection, a bearer, or an IP flow. The context corresponding to the network resource bearing the service of the UE is a context that can uniquely identify and describe the network resource, and may include information such as a bearer identifier of a bearer and a TEID.

In this embodiment of the present invention, the effective range of the context of the network resource bearing the service of the UE may be added in the foregoing context, for example, a mobility marker described below. Certainly, the foregoing effective range may also be stored in the user equipment context management device in a table or another form.

Operation 402 may include the following:

Operation 1: Receive a mobility marker sent by a first CPE.

In one embodiment, the context that is of the network resource bearing the service of the UE and that is sent by the first CPE is received, and the context of the network resource bearing the service of the UE is marked by using the mobility marker, where the mobility marker is used to indicate the effective range of the context of the network resource bearing the service of the UE, and the first CPE is a CPE in an area in which the UE is located before a location of the UE is updated; and the mobility marker is obtained based on the context of the network resource bearing the service of the UE.

In another embodiment, a message sent by the first CPE is received, where the message includes the mobility marker, and the mobility marker is stored in the first CPE in a table or another form.

Operation 2: Determine, based on the mobility marker, the effective range of the context of the network resource bearing the service of the UE.

The mobility marker includes the mobility level of the service and the location information of the UE, and the location information of the UE in the mobility marker is used to indicate a location in which the UE is located when the mobility marker is generated.

Operation 403: Determine, based on the location information of the UE and the effective range of the context of the network resource bearing the service of the UE, whether the context of the network resource bearing the service of the UE is invalid; and when the context of the network resource bearing the service of the UE includes an invalid context, perform operation 404; or when the context of the network resource bearing the service of the UE includes a valid context, perform operation 405.

Operation 403 may include: when the location information of the UE is out of the effective range of the context of the network resource bearing the service of the UE, determining that the context of the network resource bearing the service of the UE is invalid; or when the location information of the UE is within the effective range of the context of the network resource bearing the service of the UE, determining that the context of the network resource bearing the service of the UE is valid.

Operation 404: Delete the invalid context and release a network resource bearing a service corresponding to the invalid context.

Operation 405: Retain the valid context.

This embodiment of the present invention provides a user equipment context management method, so that a network may selectively delete a context when UE moves, thereby reducing network overheads, improving handover efficiency, and implementing on-demand mobility.

Figure 7:
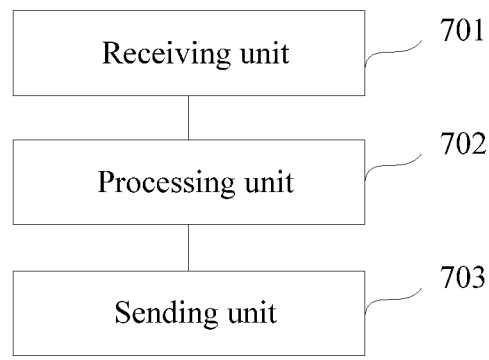
FIG. 7 is a schematic structural diagram of a user equipment context management apparatus according to an embodiment of the present invention.

FIG. 7 is a block diagram of a user equipment context management apparatus according to an embodiment of the present invention. The user equipment context management apparatus may be implemented as a whole or a part of a user equipment context management device by software, hardware, or a combination thereof, and the user equipment context management apparatus may implement the user equipment context management method provided in FIG. 3 or FIG. 4. The user equipment context management apparatus may include a receiving unit 701, a processing unit 702, and a sending unit 703.

The receiving unit 701 is configured to: receive a service request message of user equipment UE, where the service request message includes service information requested by the UE; and obtain location information of the UE.

The processing unit 702 is configured to: determine, based on the service information requested by the UE, a mobility level of a service requested by the UE; determine, based on the location information of the UE and the mobility level of the service, an effective range of a context of a network resource bearing the service of the UE; and manage the context based on the effective range of the context.

In this embodiment of the present invention, the location information of the UE is obtained, the mobility level of the service requested by the UE is determined, and the effective range of the context of the network resource bearing the service of the UE is further determined, so that during context management, a network may choose to delete or transfer the context based on the effective range of the context of the network resource bearing the service of the UE, to avoid a problem that continuity of some services with a relatively high continuity requirement is affected because contexts of network resources bearing these services are deleted.

In one embodiment, the processing unit 702 is configured to:
obtain a preset correspondence between a service and a mobility level; and
determine, based on the service information requested by the UE and the correspondence between a service and a mobility level, the mobility level of the service requested by the UE.

In another embodiment, the processing unit 702 is configured to:
obtain an SLA sent by an application function, where the SLA includes a correspondence between a service and a mobility level; and
determine, based on the service information requested by the UE and the SLA, the mobility level of the service requested by the UE.

In another embodiment, the processing unit 702 is configured to:
obtain subscription data of the UE, where the subscription data includes a correspondence between a service and a mobility level; and
determine based on the service information requested by the UE and the subscription data of the UE, the mobility level of the service requested by the UE.

In one embodiment, the processing unit 702 is configured to: when the context of the network resource bearing the service of the UE is generated, use a mobility marker to mark the context of the network resource bearing the service of the UE, where the mobility marker is used to indicate the effective range of the context of the network resource bearing the service of the UE.

The mobility marker includes the mobility level of the service and the location information of the UE, and the location information of the UE in the mobility marker is used to indicate a location in which the UE is located when the mobility marker is generated.

In one embodiment, the receiving unit 701 is further configured to obtain updated location information of the UE; and
the processing unit 702 is further configured to:
determine, based on the updated location information of the UE and the effective range of the context of the network resource bearing the service of the UE, whether the context of the network resource bearing the service of the UE is invalid; and
when the context of the network resource bearing the service of the UE includes an invalid context, delete the invalid context, and release a network resource bearing a service corresponding to the invalid context.

In another embodiment, the receiving unit 701 is further configured to obtain updated location information of the UE;
the processing unit 702 is further configured to determine, based on the updated location information of the UE and the effective range of the context of the network resource bearing the service of the UE, whether the context of the network resource bearing the service of the UE is invalid; and
the sending unit 703 is configured to: when the context of the network resource bearing the service of the UE includes a valid context, send the valid context to a CPE in an area in which the UE is located after a location of the UE is updated.

In one embodiment, when the CPE in the area in which the UE is located after the location of the UE is updated does not change, the receiving unit 701 is configured to:
receive the updated location information of the UE reported by a radio access network node RAN node; or
receive a message of the UE, where the message of the UE carries an identifier of a network node, and determine the updated location information of the UE based on the identifier of the network node; or
when the CPE in the area in which the UE is located after the location of the UE is updated changes, the receiving unit 701 is configured to:

receive the updated location information of the UE that is added in a context request sent by the CPE in the area in which the UE is located after the location of the UE is updated; or receive a context request, where the context request carries an identifier of a network node, and determine the updated location information of the UE based on the identifier of the network node.

In one embodiment, the processing unit 702 is configured to:

when the location information of the UE is out of the effective range of the context of the network resource bearing the service of the UE, determine that the context of the network resource bearing the service of the UE is invalid; or when the location information of the UE is within the effective range of the context of the network resource bearing the service of the UE, determine that the context of the network resource bearing the service of the UE is valid.

Figure 8:
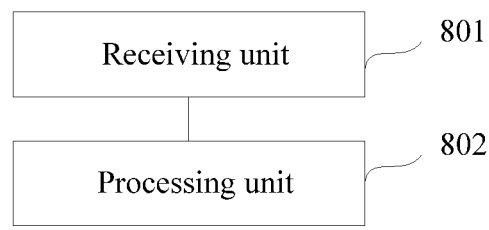
FIG. 8 is a schematic structural diagram of a user equipment context management apparatus according to an embodiment of the present invention.

FIG. 8 is a block diagram of a user equipment context management apparatus according to an embodiment of the present invention. The user equipment context management apparatus may be implemented as a whole or a part of a user equipment context management device by software, hardware, or a combination thereof, and the user equipment context management apparatus may implement the user equipment context management method provided in FIG. 5 or FIG. 6. The user equipment context management apparatus may include a receiving unit 801, and a processing unit 802.

The receiving unit 801 is configured to obtain location information of UE, and obtain an effective range of a context of a network resource bearing a service of the UE.

The processing unit 802 is configured to manage the context based on the location information of the UE and the effective range of the context of the network resource bearing the service of the UE.

In this embodiment of the present invention, when a location of the UE is updated, the processing unit 802 determines, based on the updated location information of the UE and the effective range of the context of the network resource bearing the service of the UE, whether the context of the network resource bearing the service of the UE is invalid, and only when a context of a network resource bearing a first service is invalid, deletes the context of the network resource bearing the first service, so that during context management, a network may choose, based on the effective range of the context of the network resource bearing the service of the UE in the context, to delete the context, to avoid a problem that continuity of some services with a relatively high continuity requirement is affected because contexts of network resources bearing these services are deleted.

In one embodiment, the receiving unit 801 is configured to receive a mobility marker sent by a CPE in an area in which the UE is located before a location of the UE is updated, where the mobility marker is used to indicate the effective range of the context of the network resource bearing the service of the UE.

The processing unit 802 is configured to determine, based on the mobility marker, the effective range of the context of the network resource bearing the service of the UE.

The receiving unit 801 may be configured to: receive the context, of the network resource bearing the service of the UE, that is sent by the CPE in the area in which the UE is located before the location of the UE is update, where the context of the network resource bearing the service of the UE is marked by using the mobility marker, or receive a message sent by the CPE in the area in which the UE is located before the location of the UE is updated, where the message includes the mobility marker, and the mobility marker is stored in a table or another form in the CPE in the area in which the UE is located before the location of the UE is updated.

The mobility marker includes the mobility level of the service and the location information of the UE, and the location information of the UE in the mobility marker is used to indicate a location in which the UE is located when the mobility marker is generated.

Further, the processing unit 802 is configured to:

determine, based on the location information of the UE and the effective range of the context of the network resource bearing the service of the UE, whether the context of the network resource bearing the service of the UE is invalid; and when the context of the network resource bearing the service of the UE includes an invalid context, delete the invalid context, and release a network resource bearing a service corresponding to the invalid context.

Figure 9:
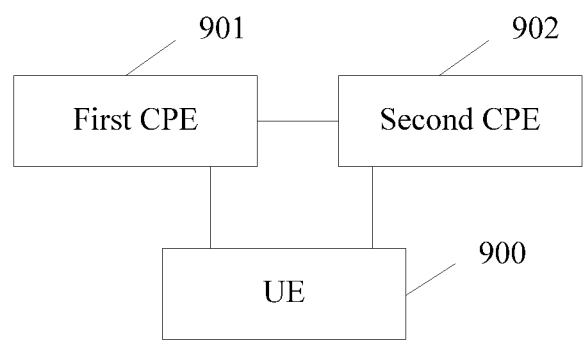
FIG. 9 is a schematic structural diagram of a user equipment context management system according to an embodiment of the present invention.

FIG. 9 is a block diagram of a user equipment context management system according to an embodiment of the present invention. Referring to FIG. 9, the system includes UE 900 and a first CPE 901.

The first CPE 901 is configured to: receive a service request message of the user equipment UE 900, where the service request message includes service information requested by the UE 900; obtain location information of the UE 900; determine, based on the service information requested by the UE 900, a mobility level of a service requested by the UE 900; determine, based on the location information of the UE 900 and the mobility level of the service, an effective range of a context of a network resource bearing the service of the UE; and manage the context based on the effective range of the context.

Further, the system may further include a second CPE 902; and when the UE 900 moves and enters a management area range of the second CPE 902, the second CPE 902 is configured to: obtain location information of the UE 900; obtain the effective range of the context of the network resource bearing the service of the UE 900; and manage the context based on the location information of the UE 900 and the effective range of the context of the network resource bearing the service of the UE 900.

The context of the network resource bearing the service of the UE 900 managed by the second CPE 902 is sent by the first CPE 901 to the second CPE 902.

Further, the first CPE 901 may be further configured to perform the user equipment context management method provided in FIG. 4. The second CPE 902 may be further configured to perform the user equipment context management method provided in FIG. 6.

It should be noted that, when the user equipment context management apparatus provided in the foregoing embodiments manages a user equipment context, division of the foregoing function units is merely used as an example for description. In actual application, the foregoing functions may be allocated to different functional units for implementation as required. That is, an internal structure of the apparatus is divided into different functional units to implement all or some of the functions described above. In addition, the user equipment context management apparatus provided in the foregoing embodiments and the user equipment context management method embodiments belong to a same concept. For a specific implementation process, refer to the method embodiments, and details are not described herein again.

A person of ordinary skill in the art may understand that all or some of the operations of the embodiments may be implemented by hardware or a program instructing related hardware. The program may be stored in a computer-readable storage medium. The storage medium may include a read-only memory, a magnetic disk, or an optical disc.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A user equipment context management method, comprising:
   receiving, by a first control plane entity, a service request message of a user equipment (UE), wherein the service request message comprises service information requested by the UE;
   obtaining location information of the UE;
   determining, based on the service information requested by the UE, a mobility level of a service requested by the UE;
   determining, based on the location information of the UE and the mobility level of the service, an effective range of a context of a network resource bearing the service of the UE; and
   managing the context based on the effective range of the context, comprising:
      when generating the context of the network resource bearing the service of the UE, using a mobility marker to mark the context of the network resource bearing the service of the UE, wherein the mobility marker is used to indicate the effective range of the context of the network resource bearing the service of the UE;
      obtaining updated location information of the UE;
      determining, based on the updated location information of the UE and the effective range of the context of the network resource bearing the service of the UE, whether the context of the network resource bearing the service of the UE is invalid; and
      when the context of the network resource bearing the service of the UE comprises an invalid context, deleting the invalid context, and releasing a network resource bearing a service corresponding to the invalid context.

2. The method according to claim 1, wherein the determining, based on the service information requested by the UE, a mobility level of a service requested by the UE comprises:
   obtaining a preset correspondence between a service and a mobility level; and
   determining, based on the service information requested by the UE and the correspondence between a service and a mobility level, the mobility level of the service requested by the UE.

3. The method according to claim 1, wherein the determining, based on the service information requested by the UE, a mobility level of a service requested by the UE comprises:
   obtaining a service level agreement (SLA) sent by an application function, wherein the SLA comprises a correspondence between a service and a mobility level; and
   determining, based on the service information requested by the UE and the SLA, the mobility level of the service requested by the UE.

4. The method according to claim 1, wherein the determining, based on the service information requested by the UE, a mobility level of a service requested by the UE comprises:
   obtaining subscription data of the UE, wherein the subscription data comprises a correspondence between a service and a mobility level; and
   determining, based on the service information requested by the UE and the subscription data of the UE, the mobility level of the service requested by the UE.

5. The method according to claim 1, wherein the mobility marker comprises the mobility level of the service and the location information of the UE, and the location information of the UE in the mobility marker is used to indicate a location in which the UE is located when the mobility marker is generated.

6. The method according to claim 1, wherein the managing the context based on the effective range of the context further comprises:
   obtaining updated location information of the UE;
   determining, based on the updated location information and the effective range of the context of the network resource bearing the service of the UE, whether the context of the network resource bearing the service of the UE is invalid; and
   when the context of the network resource bearing the service of the UE comprises a valid context, sending the valid context to a second control plane entity, wherein the second control plane entity is a control plane entity in an area in which the UE is located after a location of the UE is updated.

7. The method according to claim 1, wherein
when the first control plane entity in an area in which the UE is located after the location of the UE is updated does not change, the obtaining updated location information of the UE comprises:
   receiving the updated location information of the UE reported by a radio access network (RAN) node or receiving a message of the UE, wherein the message of the UE carries an identifier of a network node, and determining the updated location information of the UE based on the identifier of the network node; or
when the first control plane entity in the area in which the UE is located after the location of the UE is updated changes, the obtaining updated location information of the UE comprises:
   receiving the updated location information of the UE that is added in a context request sent by a second control plane entity or receiving a context request, wherein the context request carries an identifier of a network node, and determining the updated location information of the UE based on the identifier of the network node.

8. The method according to claim 1, wherein the determining, based on the updated location information of the UE and the effective range of the context of the network resource bearing the service of the UE, whether the context of the network resource bearing the service of the UE is invalid comprises:
   when the location information of the UE is out of the effective range of the context of the network resource bearing the service of the UE, determining that the context of the network resource bearing the service of the UE is invalid; or when the location information of the UE is within the effective range of the context of the network resource bearing the service of the UE, determining that the context of the network resource bearing the service of the UE is valid.

9. A user equipment context management method, comprising:
obtaining, by a second control plane entity, location information of a user equipment (UE);
obtaining an effective range of a context of a network resource bearing a service of the UE, comprising
receiving a mobility marker sent by a first control plane entity; and
determining, based on the mobility marker, the effective range of the context of the network resource bearing the service of the UE; and
managing the context based on the location information of the UE and the effective range of the context of the network resource bearing the service of the UE, comprising
determining, based on the location information of the UE and the effective range of the context of the network resource bearing the service of the UE, whether the context of the network resource bearing the service of the UE is invalid; and
when the context of the network resource bearing the service of the UE comprises an invalid context, deleting the invalid context, and releasing a network resource bearing a service corresponding to the invalid context.

10. The method according to claim 9, wherein the mobility marker comprises a mobility level of the service and the location information of the UE, and the location information of the UE in the mobility marker is used to indicate a location in which the UE is located when the mobility marker is generated.

11. A user equipment context management apparatus, comprising:
a memory storage comprising instructions; and
one or more processors in communication with the memory storage, wherein the one or more processors execute the instructions to:
receive a service request message of user equipment (UE), wherein the service request message comprises service information requested by the UE;
obtain location information of the UE;
determine, based on the service information requested by the UE, a mobility level of a service requested by the UE;
determine, based on the location information of the UE and the mobility level of the service, an effective range of a context of a network resource bearing the service of the UE; and
manage the context based on the effective range of the context, wherein the one or more processors execute the instructions to use a mobility marker to mark the context of the network resource bearing the service of the UE, wherein the mobility marker is used to indicate the effective range of the context of the network resource bearing the service of the UE, wherein the one or more processors execute the instructions to
obtain updated location information of the UE;
determine, based on the updated location information of the UE and the effective range of the context of the network resource bearing the service of the UE, whether the context of the network resource bearing the service of the UE is invalid; and
when the context of the network resource bearing the service of the UE comprises an invalid context, delete the invalid context, and release a network resource bearing a service corresponding to the invalid context.

12. The apparatus according to claim 11, wherein the one or more processors execute the instructions to:
obtain a preset correspondence between a service and a mobility level; and
determine, based on the service information requested by the UE and the correspondence between a service and a mobility level, the mobility level of the service requested by the UE.

13. The apparatus according to claim 11, wherein the one or more processors execute the instructions to:
obtain a service level agreement (SLA) sent by an application function, wherein the SLA comprises a correspondence between a service and a mobility level; and
determine, based on the service information requested by the UE and the SLA, the mobility level of the service requested by the UE.

14. The apparatus according to claim 11, wherein the one or more processors execute the instructions to:
obtain subscription data of the UE, wherein the subscription data comprises a correspondence between a service and a mobility level; and
determine, based on the service information requested by the UE and the subscription data of the UE, the mobility level of the service requested by the UE.

15. A user equipment context management apparatus, comprising:
a memory storage comprising instructions; and
one or more processors in communication with the memory, wherein the one or more processors execute the instructions to:
obtain location information of a user equipment (UE);
obtain an effective range of a context of a network resource bearing a service of the UE, wherein the one or more processors execute the instructions to
receive a mobility marker sent by a control plane entity in an area in which the UE is located before a location of the UE is updated; and
determine, based on the mobility marker, the effective range of the context of the network resource bearing the service of the UE; and
manage the context based on the location information of the UE and the effective range of the context of the network resource bearing the service of the UE
determine, based on the location information of the UE and the effective range of the context of the network resource bearing the service of the UE, whether the context of the network resource bearing the service of the UE is invalid; and wherein the one or more processors execute the instructions to
when the context of the network resource bearing the service of the UE comprises an invalid context, delete the invalid context, and release a network resource bearing a service corresponding to the invalid context.

* * * * *